E. W. CAMPAGNA.
POCKET SAW JOINTER.
APPLICATION FILED MAY 15, 1908.
931,992. Patented Aug. 24, 1909.
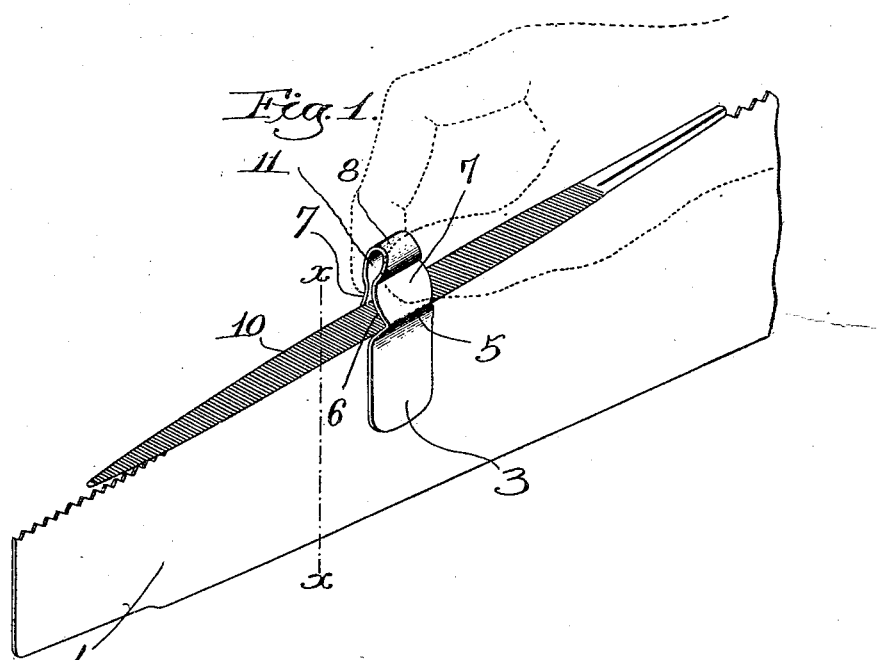
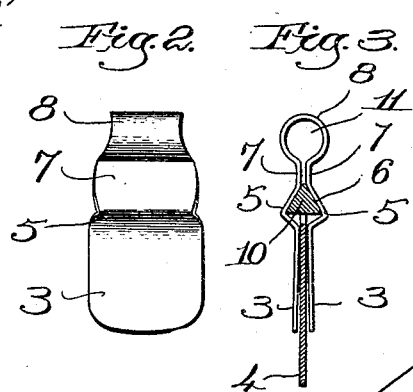
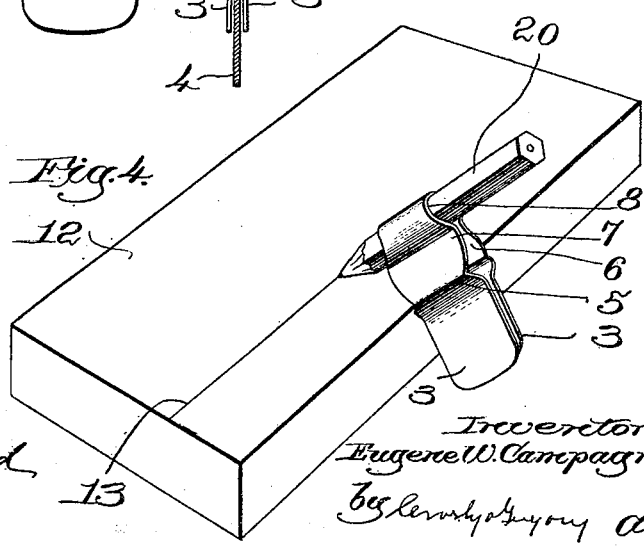
Witnesses.
Thomas J. Drummond
Joseph M. Ward
Inventor.
Eugene W. Campagna,
by Leroy Gregory attys

UNITED STATES PATENT OFFICE.

EUGENE W. CAMPAGNA, OF RANDOLPH, MASSACHUSETTS.

POCKET SAW-JOINTER.

931,992.  Specification of Letters Patent.  Patented Aug. 24, 1909.

Application filed May 15, 1908. Serial No. 433,022.

*To all whom it may concern:*

Be it known that I, EUGENE W. CAMPAGNA, a citizen of the United States, residing at Randolph, county of Norfolk, and State of Massachusetts, have invented an Improvement in Pocket Saw-Jointers, of which the following description, in connection with the accompanying drawing, is a specification, like figures on the drawing representing like parts.

This invention relates to saw jointers adapted to level and even up the teeth of saws after they have become worn, and the invention has for its particular object to provide a novel device for holding the file by which the jointing operation is accomplished, all as will be more fully hereinafter described and then pointed out in the claim.

The drawings show a saw jointer embodying my invention and the manner in which it is used.

Figure 1 is a perspective view of a portion of a saw showing the manner in which my improved saw jointer is used; Fig. 2 is a side view of the file-holder; Fig. 3 is substantially a section on the line x—x, Fig. 1; Fig. 4 shows the manner in which the device may be used as a gage.

My improved jointer is formed of a single piece of sheet metal which is bent into the desired shape. The completed jointer or file-holder is formed with the two arms or side pieces 3 which form between them a space to receive the saw 4 and each of which is bent outwardly at 5 to form the file-receiving opening or pocket 6. Immediately above the file-receiving pocket 6 the two sides of the jointer are bent into close proximity with each other and then are shaped to form the rounded portion 8 which constitutes a pencil-receiving recess.

The device is made of resilient material. In using it as a saw jointer, a file 10, preferably a three-cornered file, is inserted into the file-receiving pocket 6, as shown in Figs. 1 and 3, the two faces of the file resting against the flat sides of the pocket and the third face of the file standing square across the jointer in position to act on the ends of the saw teeth. After the file has thus been inserted into the holder, it is placed over the saw, the two side pieces 3 embracing the sides of the saw and acting to guide the jointer in its movement over the saw.

In using the device, the operator grasps the two sides with the thumb and fore finger, as shown in dotted lines Fig. 1, and allows the palm of the hand to rest on the top of the file. In this way the file may be held in its proper position and yet sufficient pressure may be applied thereto to properly accomplish the desired object.

Owing to the fact that the device is made of resilient material, the sides thereof will be resilient at the point 7 above the file-receiving pocket and again at the point immediately below the file-receiving pocket, so that files of different sizes may be readily used. If a larger file than that shown in the drawings is used, the resiliency of the sides permits the portions 3 to be closed onto the sides of the saw, so as to properly guide the tool.

My improved device is also capable of use as a gage, as shown in Fig. 4. When used in this way, the file is removed and a pencil 20 is inserted into the pencil-receiving recess 11, and the sides of the device may then be grasped by the operator with his thumb and fore finger and pinched together, thus causing the pencil to be gripped firmly. The edge of the holder may then be brought against the corner or edge of a block or board 12 on which a mark 13 is to be made parallel to the edge and by passing the device along the edge of the block in a manner similar to that in which a gage is operated, the desired line 13 will be made.

If desired the edges of the device may be notched where the file-receiving pocket 6 terminates, and this notch makes a convenient guide to engage the edge of the board.

My improved device is comparatively flat and thin and is constructed without sharp corners so that it can be readily carried in a person's pocket without inconvenience and without injuring the clothing.

Having fully described my invention, what I claim as new and desire to secure by Letters Patent is:—

A saw jointer made from a single piece of resilient sheet metal doubled on itself to present two sides adapted to embrace a saw and also to present a pencil-receiving portion 11, each side being bent outwardly at 5 thereby to form a file-receiving pocket, said sides being resilient at points both above and below the file-receiving pocket.

In testimony whereof, I have signed my name to this specification, in the presence of two subscribing witnesses.

EUGENE W. CAMPAGNA.

Witnesses:
EMILY C. HODGES,
FREDERICK S. GREENLEAF.